(12) United States Patent
Burch et al.

(10) Patent No.: US 12,376,574 B2
(45) Date of Patent: Aug. 5, 2025

(54) FISHING LINE PROTECTOR

(71) Applicant: Fly Catching LLC, Boulder, CO (US)

(72) Inventors: Jason D. Burch, Boulder, CO (US);
Ryan Thousand, Gypsum, CO (US)

(73) Assignee: Fly Catching LLC, Boulder, CO (US)

(*) Notice: Subject to any disclaimer, the term of this patent is extended or adjusted under 35 U.S.C. 154(b) by 0 days.

(21) Appl. No.: 18/428,701

(22) Filed: Jan. 31, 2024

(65) Prior Publication Data
US 2024/0251770 A1 Aug. 1, 2024

Related U.S. Application Data

(60) Provisional application No. 63/442,562, filed on Feb. 1, 2023.

(51) Int. Cl.
*A01K 89/01* (2006.01)

(52) U.S. Cl.
CPC .......................... *A01K 89/011221* (2015.05)

(58) Field of Classification Search
CPC .............................................. A01K 89/011221
See application file for complete search history.

(56) References Cited

U.S. PATENT DOCUMENTS

| | | | | |
|---|---|---|---|---|
| 4,834,311 A | * | 5/1989 | Kaneko | A01K 89/01 |
| | | | | 242/231 |
| 2023/0172180 A1 | * | 6/2023 | Jo | A01K 89/006 |
| | | | | 242/223 |

FOREIGN PATENT DOCUMENTS

| | | | | |
|---|---|---|---|---|
| DE | 1211852 B | * | 3/1966 | |
| EP | 3183962 A1 | * | 6/2017 | ............ A01K 89/01 |
| GB | 1068417 A | * | 5/1967 | |
| KR | 20010001475 U | * | 1/2001 | |
| KR | 20080000504 A | * | 1/2008 | |
| KR | 20000004148 U | * | 7/2015 | |
| KR | 20240015514 A | * | 2/2024 | |

OTHER PUBLICATIONS

Orvis Hydros Reels, http://www.orvis.com/orvis-hydros-reels/2ZA00810.html, Apr. 26, 2023 (2 pages).

* cited by examiner

*Primary Examiner* — Christopher P Ellis
(74) *Attorney, Agent, or Firm* — Amundsen Davis, LLC

(57) ABSTRACT

Fishing line protectors are provided that are configured to attach to the foot of a fly fishing reel. The fishing line protectors include a base piece that has a first end, a second end opposite the first end, an inner side and an outer side. The fishing line protectors also include a first leg connected to the inner side of the base piece at the first end that extends away from the base piece and terminates in a first knob at a first distal end of the first leg, and a second leg connected to the inner side of the base piece at the second end that extends away from the base piece and terminates in a second knob at a second distal end of the second leg.

18 Claims, 5 Drawing Sheets

FISHING LINE PROTECTOR

FIELD OF THE INVENTION

The present technology relates to fishing line protectors, and particularly to fishing line protectors that can be added to the foot of a fly fishing reel.

BACKGROUND

Currently known fly fishing reels tend to have feet that have a generally rectangular shaft. For example, FIG. 1 illustrates one example of a currently known fly fishing reel 100. The fly fishing reel 100 includes a foot 102, which has a generally rectangular portion 104 that line may be wrapped around during use. The generally rectangular portion 104 includes corners 106. Such corners tend to damage fishing line when the line is wrapped around the foot, particularly as the line rubs against the corners over time.

SUMMARY

Fishing line protectors are provided herein.

In one aspect, a fishing line protector is provided that includes a base piece, a first leg, and a second leg. The base piece has a first end, a second end opposite the first end, an inner side and an outer side. The first leg is connected to the inner side of the base piece at the first end that extends away from the base piece and terminates in a first knob at a first distal end of the first leg. The second leg is connected to the inner side of the base piece at the second end that extends away from the base piece and terminates in a second knob at a second distal end of the second leg. In at least one example, the outer side of the base piece is rounded and includes a groove along at least a portion of the outer side of the base piece.

BRIEF DESCRIPTION OF THE DRAWINGS

Specific examples have been chosen for purposes of illustration and description, and are shown in the accompanying drawings, forming a part of the specification.

Figure 1:
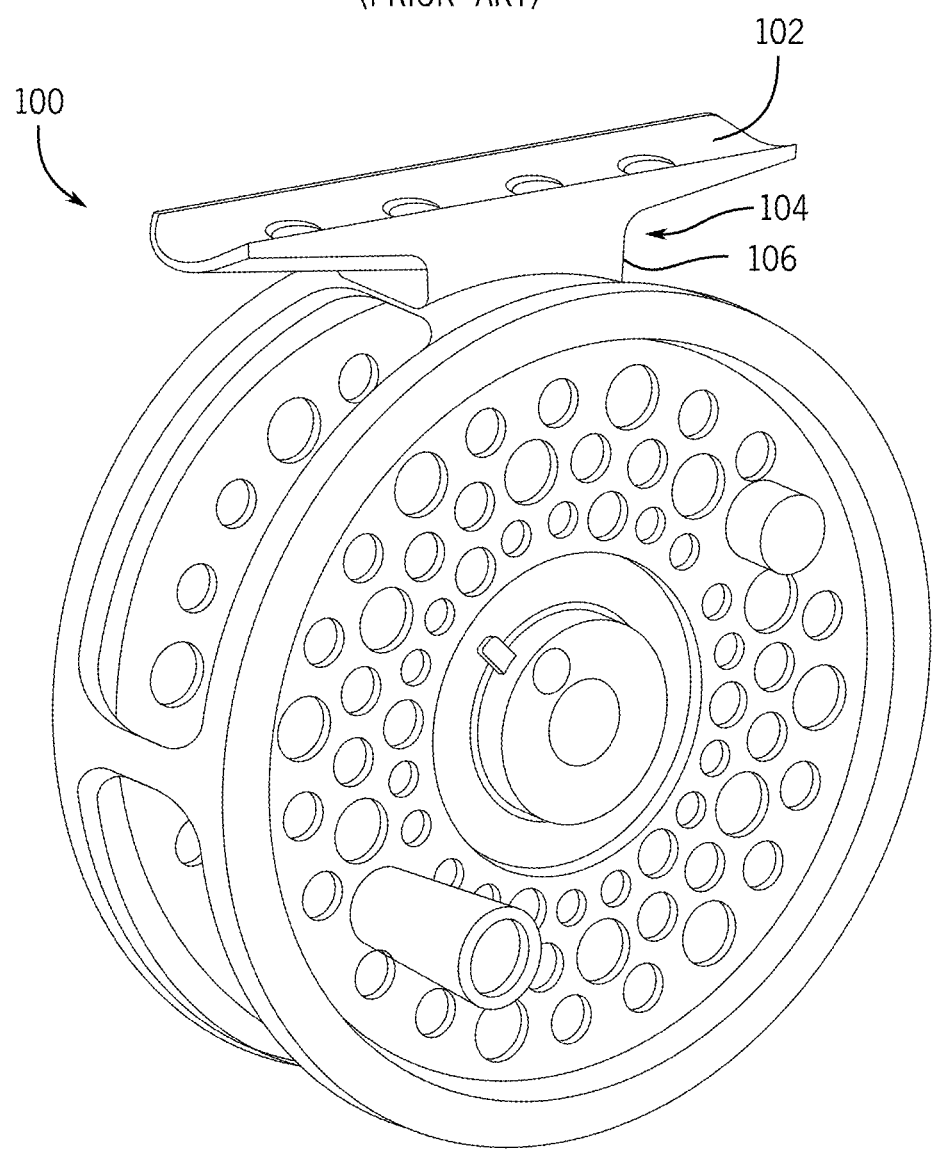
FIG. 1 illustrates a perspective view of one example of a known (prior art) fishing reel.

While various embodiments discussed herein are amenable to modifications and alternative forms, aspects thereof have been shown by way of example in the drawings and are described in detail herein. It should be understood, however, that the disclosure is not limited to the particular embodiments described, and instead is meant to include all modifications, equivalents, and alternatives falling within the scope of the disclosure. In addition, the terms "example" and "embodiment" as used throughout this application is only by way of illustration, and not limitation, the Figures are not necessarily drawn to scale, and the use of the same reference symbols in different drawings indicates similar or identical items unless otherwise noted.

DETAILED DESCRIPTION

Fishing line protectors of the present technology are generally configured to attach to the foot of a fly fishing reel, such as the foot 102 of reel 100 shown in FIG. 1, to protect the fishing line from damage due to rubbing on the corners of the reel foot. As used herein, the term "configured to" means that the component is structurally and functionally designed and formed in a manner that does whatever the component is said to be configured to do. Additionally, the term "fishing line" as used herein includes any line, leader, tippet, or other Monofilament, Braided, Fluorocarbon, Wire or Fly line.

Figure 2:
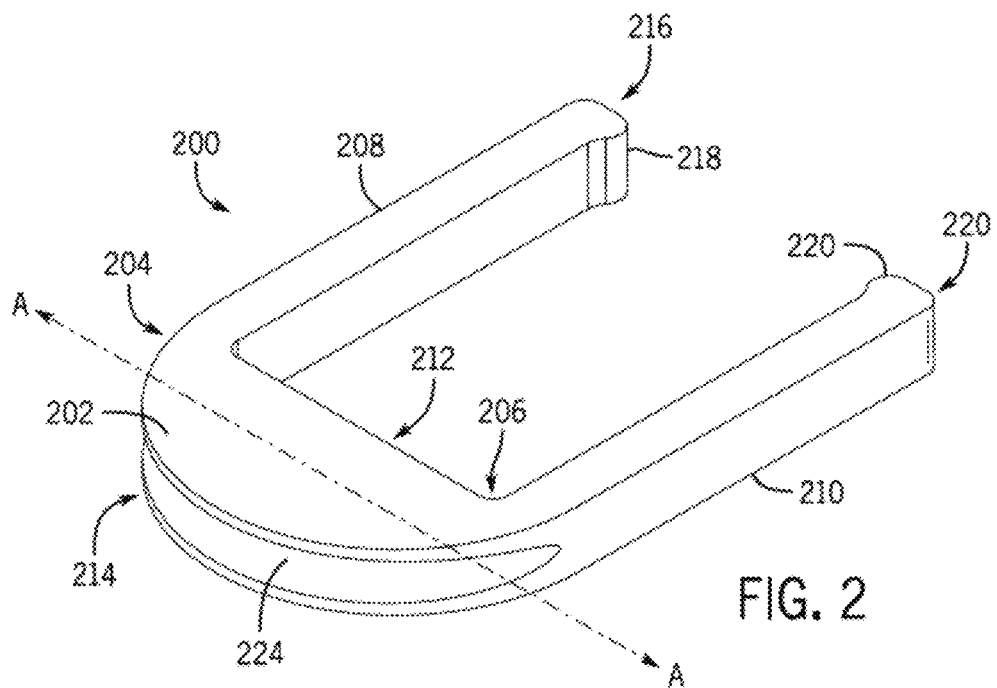
FIG. 2 illustrates a front perspective view of one example of a fishing line protector of the present technology.
Figure 3:
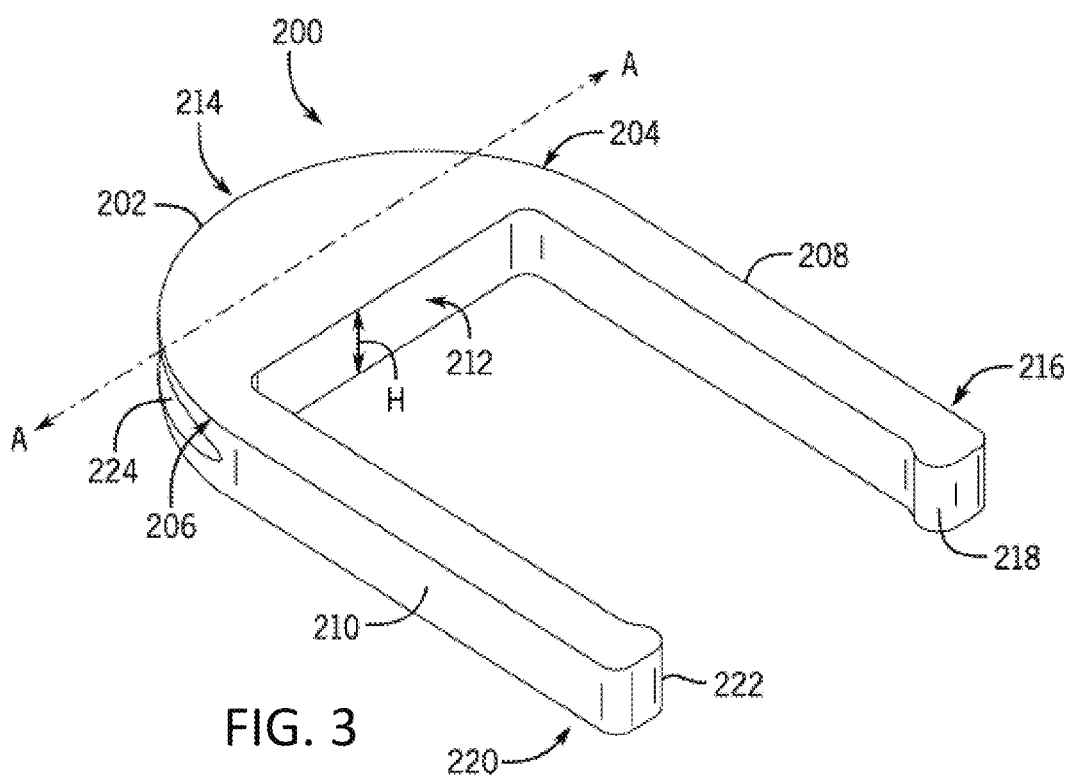
FIG. 3 illustrates a top view of the fishing line protector of FIG. 1.
Figure 4:
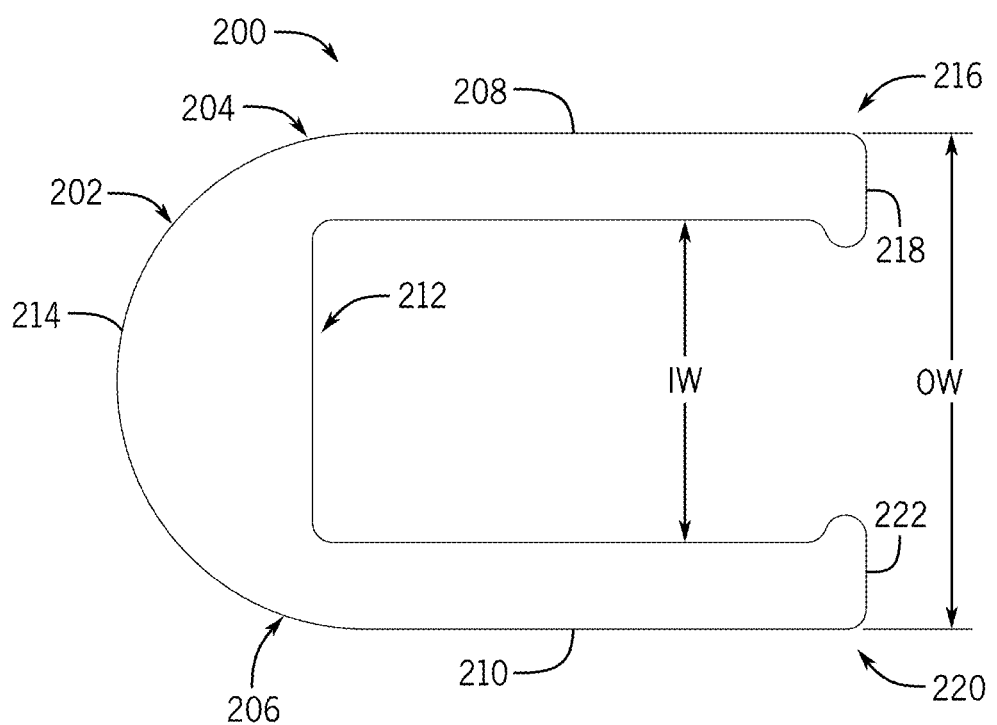
FIG. 4 illustrates a rear perspective view of the fishing line protector of FIG. 2.
Figure 5:
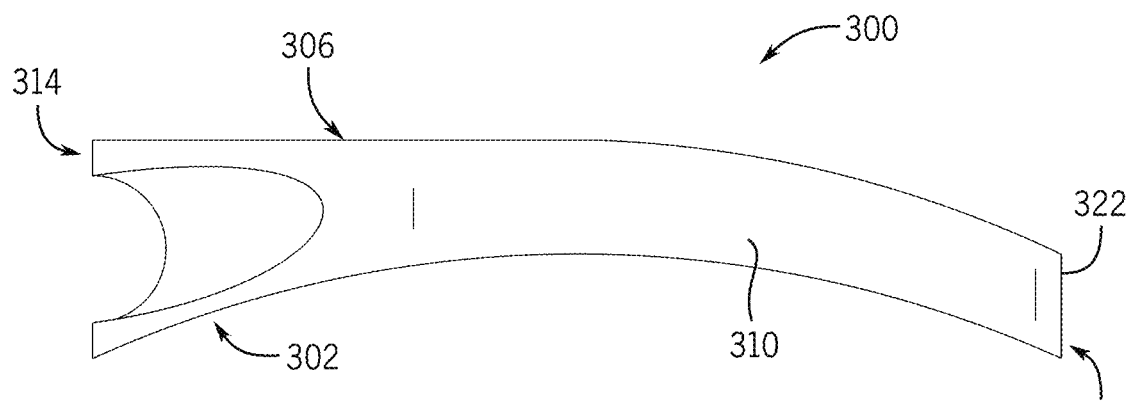
FIG. 5 illustrates a side view of a second example of a fishing line protector of the present technology.
Figure 6:
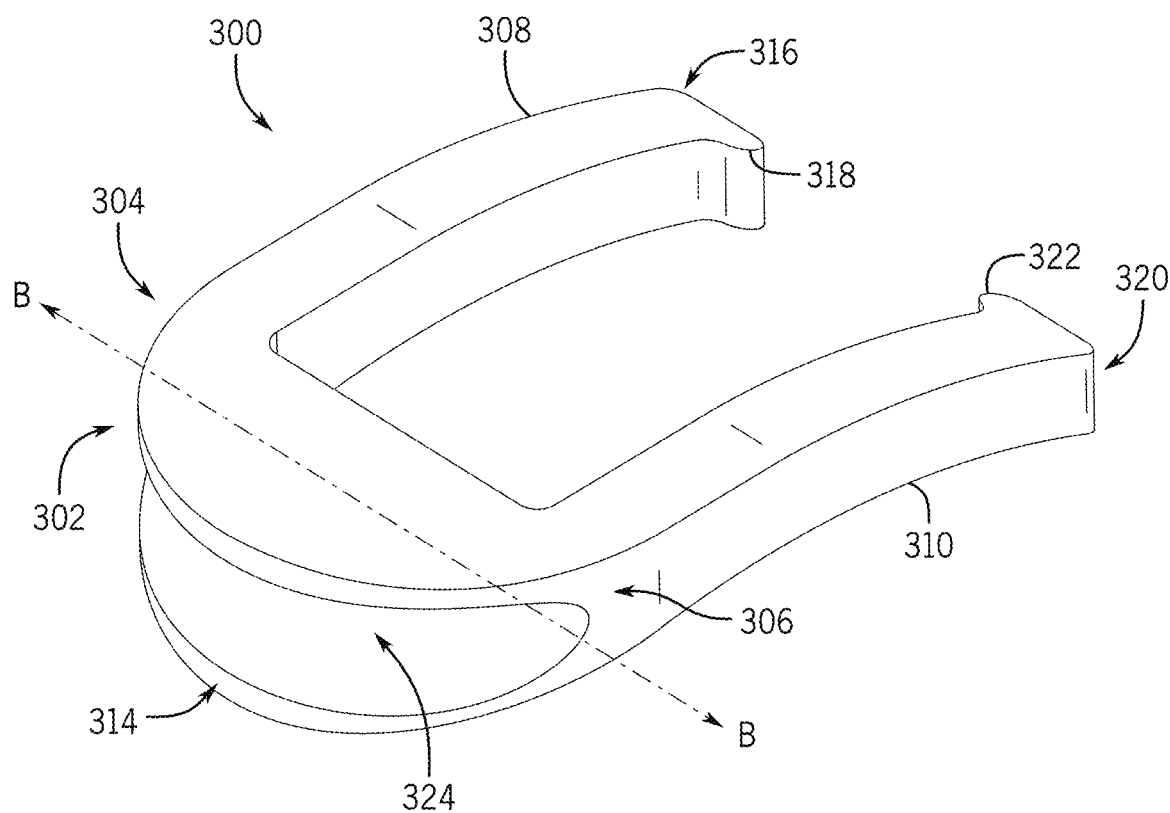
FIG. 6 illustrates a front perspective view of the fishing line protector of FIG. 4.
Figure 7:
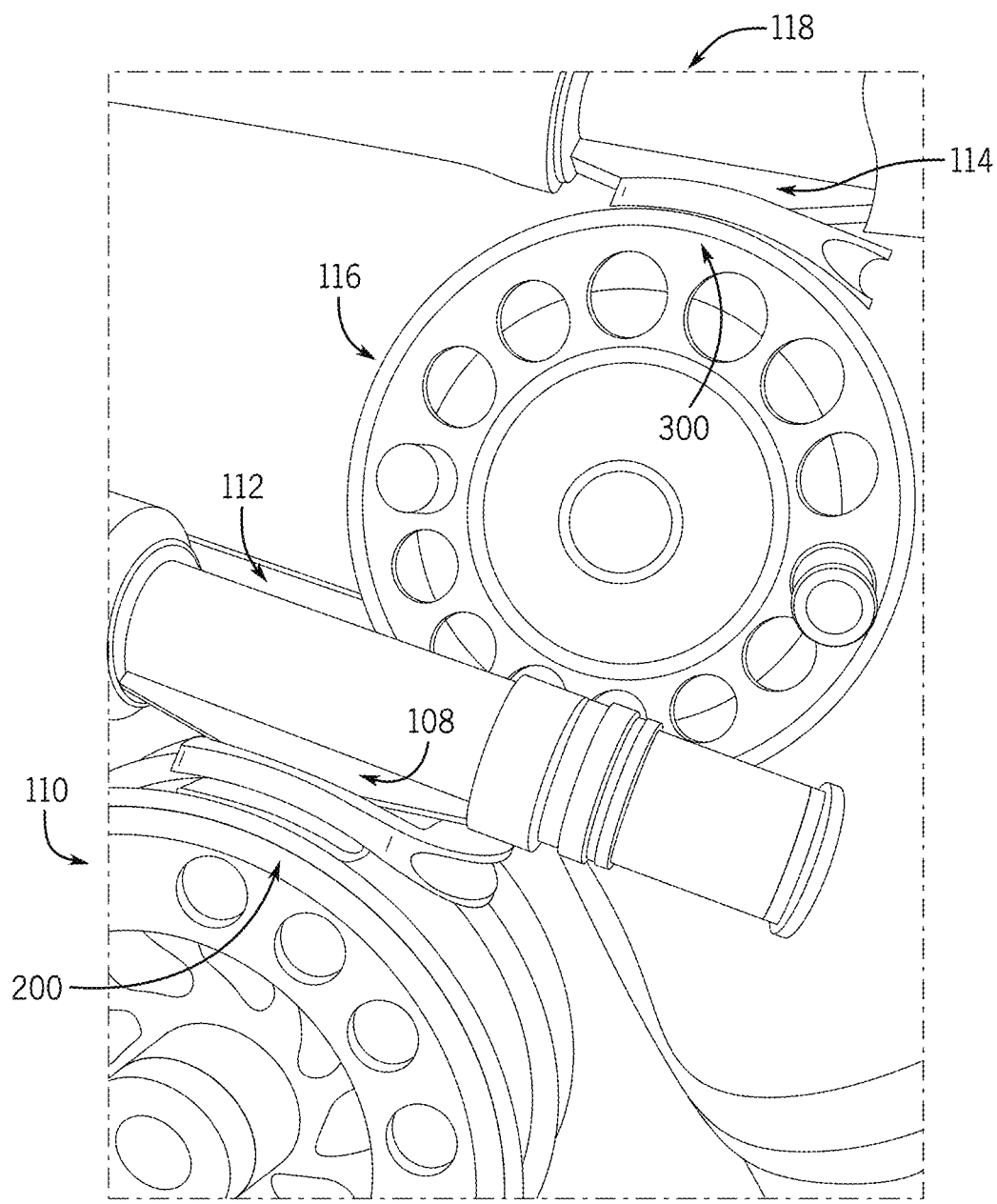
FIG. 7 illustrates the fishing line protector of FIGS. 2-3 and the fishing line protector of FIGS. 4-5, each installed on the foot of a fly fishing reel.

FIGS. 2-4 illustrate a first example of a fishing line protector 200 of the present technology. FIGS. 5 and 6 illustrate a second example of a fishing line protector 300 of the present technology. FIG. 7 illustrates the fishing line protector 200 and the fishing line protector 300, each installed on a fly fishing reel.

Referring to FIGS. 2-4, the fishing line protector 200 has an overall structure that is generally U-shaped. The fishing line protector 200 has a base piece 202 that has a first end 204 and a second end 206 that is opposite the first end. The base piece 202 also includes an inner side 212 and an outer side 214. The fishing line protector 200 has a first leg 208 connected to the inner side 212 of the base piece 202 at the first end 204. The fishing line protector 200 has a second leg 210 connected to inner side 212 of the base piece 202 at the second end 206. The base piece 202 may extend along a first axis A-A from the first end 204 to the second end 208. The first leg 208 and the second leg 210 may each connect with the base piece 202 in a manner that is perpendicular, or substantially perpendicular, to the first axis A-A. The first leg 208 and the second leg 210 may each extend away from the base piece 202, and the first leg 208 may be parallel, or substantially parallel, to the second leg 210. In at least some examples, the first leg 208 and the second leg 210 may each be integrally formed with the base piece 202.

The first leg 208 extends away from the inner side 212 of the base piece 202 and terminates at a first distal end 216. The first distal end 216 of the first leg 208 includes a first knob 218. The first knob 218 may extend inwardly from the first distal end 212, towards the second leg 210. The first knob 218 may have any suitable shape, such as being rounded or curved.

The second leg 210 extends away from the inner side 212 of the base piece 202 and terminates at a second distal end 220. The second distal end 220 of the second leg 210 includes a second knob 222. The second knob 222 may extend inwardly from the second distal end 220, towards the first leg 208. The second knob 222 may have any suitable shape, such as being rounded or curved.

The inner side 212 of the base piece 202, may be straight, or substantially straight. The first leg 208 and the second leg 210 may each form a corner with the inner side 212 of the base piece 202, and the corner may be rounded.

The inner side 212 of the base piece 202, the first leg 208, the second leg 210, the first knob 218 and the second knob 220 may be configured to, collectively, removably secure the fishing line protector 200 to the foot of a fly fishing reel, such as foot 104 of reel 100 shown in FIG. 1. Although the fishing line protector 200 may have any suitable shape, the inner side 212 of the base piece 202, the first leg 208, the second leg 210, the first knob 218 and the second knob 220 may be configured to, collectively, form a rectangular shape that fits around and engages the foot of a fly fishing reel, such as foot 104 of reel 100 shown in FIG. 1.

Fishing line protectors of the present technology may be made of any suitable material, and are preferably made of a material that tends to maintain and return to its original its shape. The material is preferably sufficiently flexible to allow the legs to flex outwardly and then return to their original shape when the fishing line protector is slidably attached to the foot of a fly fishing reel. In some examples, fishing line protectors may be made of materials including but not limited to nylon, acrylonitrile butadiene styrene, acrylonitrile styrene acrylate, elastomers, rubber, carbon fiber, or metals such as aluminum, copper, tin, and pewter.

The outer side 214 of the base piece 202 may be rounded, such as being semi-circular or semi-ovoid. The outer side 214 of the base piece 202 may include a groove 224. The groove 224 extends along a portion of the outer side 214 of the base piece 202, and may extend along a substantial portion of the outer side 214 of the base piece 202, or even the along entirety of the outer side 214 of the base piece 202. The groove 224 may have any suitable cross-section, such as having a curved cross-section, and is preferably configured to receive fishing line and allow the fishing line to move within the groove 224 without causing damage to the fishing line.

Referring to FIG. 4, fishing line protectors of the present technology may have any dimensions suitable for fitting onto the foot of a fly fishing reel. In at least one example, fishing line protector 200 has an overall length L of about 42 millimeters (mm), and an outer width OW of about 20 mm. Referring to FIG. 3, in at least one example, the fishing line protector 200 may have a height H of about 9 mm.

The fishing line protector 200 as shown in FIGS. 2-4 has a flat, or substantially flat, profile (i.e., side view), in which the base piece 202, the first leg 208 and the second leg 210 are all substantially planar with respect to each other. However, in other examples, such as the fishing line protector 300 shown in FIGS. 5-6, the fishing line protector may have a curved profile. Referring to FIG. 7, fishing line protector 200 is shown installed on the foot 108 of a fly fishing reel 110 that is attached to a fly fishing pole 112. Additionally, fishing line protector 300 is shown installed on the foot 114 of a fly fishing reel 116 that is attached to a fly fishing pole 118.

FIGS. 5-6 show a side elevational view and a front perspective view of the second example of a fishing line protector 300 of the present technology. The fishing line protector 300 is similar to the fishing line protector 200, except that the fishing line protector 300 has a curved profile. The curve of the profile of the fishing line protector 300 may be configured to match the curve of a fly fishing reel.

Referring to FIGS. 5-6, the fishing line protector 300 has an overall structure that is generally U-shaped. The fishing line protector 300 has a base piece 302 that has a first end 304 and a second end 306 that is opposite the first end. The base piece 302 also includes an inner side 312 and an outer side 314. The fishing line protector 300 has a first leg 308 connected to the inner side 312 of the base piece 302 at the first end 304. The fishing line protector 300 has a second leg 310 connected to inner side 312 of the base piece 302 at the second end 306. The base piece 302 may extend along a first axis B-B from the first end 304 to the second end 308. The first leg 308 and the second leg 310 may each connect with the base piece 302 in a manner that is perpendicular, or substantially perpendicular, to the first axis B-B. The first leg 308 and the second leg 310 may each extend away from the base piece 302, and the first leg 308 may be parallel, or substantially parallel, to the second leg 310. In at least some examples, the first leg 308 and the second leg 310 may each be integrally formed with the base piece 302.

The first leg 308 extends away from the inner side 312 of the base piece 302 and terminates at a first distal end 316. The first distal end 316 of the first leg 308 includes a first knob 318. The first knob 318 may extend inwardly from the first distal end 312, towards the second leg 310. The first knob 318 may have any suitable shape, such as being rounded or curved.

The second leg 310 extends away from the inner side 312 of the base piece 302 and terminates at a second distal end 320. The second distal end 320 of the second leg 310 includes a second knob 322. The second knob 322 may extend inwardly from the second distal end 320, towards the first leg 308. The second knob 322 may have any suitable shape, such as being rounded or curved.

The inner side 312 of the base piece 302, may be straight, or substantially straight. The first leg 308 and the second leg 310 may each form a corner with the inner side 312 of the base piece 302, and the corner may be rounded.

The inner side 312 of the base piece 302, the first leg 308, the second leg 310, the first knob 318 and the second knob 320 may be configured to, collectively, removably secure the fishing line protector 300 to the foot of a fly fishing reel, such as foot 104 of reel 100 shown in FIG. 1. Although the fishing line protector 300 may have any suitable shape, the inner side 312 of the base piece 302, the first leg 308, the second leg 310, the first knob 318 and the second knob 320 may be configured to, collectively, form a rectangular shape that fits around and engages the foot of a fly fishing reel, such as foot 104 of reel 100 shown in FIG. 1.

The outer side 314 of the base piece 302 may be rounded, such as being semi-circular or semi-ovoid. The outer side 314 of the base piece 302 may include a groove 324. The groove 324 extends along a portion of the outer side 314 of the base piece 302, and may extend along a substantial portion of the outer side 314 of the base piece 302, or even the along entirety of the outer side 314 of the base piece 302. The groove 324 may have any suitable cross-section, such as having a curved cross-section, and is preferably configured to receive fishing line and allow the fishing line to move within the groove 324 without causing damage to the fishing line.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:
1. A fishing line protector comprising:
   a base piece that has a first end, a second end opposite the first end, an inner side and an outer side;
   a first leg connected to the inner side of the base piece at the first end that extends away from the base piece and terminates in a first knob at a first distal end of the first leg; and a second leg connected to the inner side of the base piece at the second end that extends away from the base piece and terminates in a second knob at a second distal end of the second leg.

2. The fishing line protector of claim 1, wherein the first leg is parallel to the second leg.

3. The fishing line protector of claim 1, wherein the first knob extends inwardly from the first distal end towards the second leg.

4. The fishing line protector of claim 1, wherein the second knob extends inwardly from the second distal end towards the first leg.

5. The fishing line protector of claim 1, wherein the inner side of the base piece is straight.

6. The fishing line protector of claim 1, wherein the outer side of the base piece is rounded and includes a groove along at least a portion of the outer side of the base piece.

7. The fishing line protector of claim 1, wherein the groove has a curved cross-section.

8. The fishing line protector of claim 1, wherein the fishing line protector has a flat profile.

9. The fishing line protector of claim 1, wherein the fishing line protector has a curved profile.

10. The fishing line protector of claim 1, wherein the fishing line protector has a length of about 42 mm, an outer width of about 20 mm, and a height of about 9 mm.

11. A fishing line protector comprising:
 a base piece that has a first end, a second end opposite the first end, an inner side and an outer side;
 a first leg connected to the inner side of the base piece at the first end that extends away from the base piece and terminates in a first knob at a first distal end of the first leg; and
 a second leg connected to the inner side of the base piece at the second end that extends away from the base piece and terminates in a second knob at a second distal end of the second leg;
 wherein the outer side of the base piece is rounded and includes a groove along at least a portion of the outer side of the base piece.

12. The fishing line protector of claim 11, wherein the first leg is parallel to the second leg.

13. The fishing line protector of claim 11, wherein the first knob extends inwardly from the first distal end towards the second leg.

14. The fishing line protector of claim 11, wherein the second knob extends inwardly from the second distal end towards the first leg.

15. The fishing line protector of claim 11, wherein the inner side of the base piece is straight.

16. The fishing line protector of claim 11, wherein the groove has a curved cross-section.

17. The fishing line protector of claim 11, wherein the fishing line protector has a flat profile.

18. The fishing line protector of claim 11, wherein the fishing line protector has a curved profile.

\* \* \* \* \*